3,803,109
RADIATION CURABLE PRINTING INK

Yuhei Nemoto, Tokyo, Michihiko Shiraishi, Kawaguchi, and Toshiyuki Syuto, Urawa, Japan, assignors to Dainippon Ink and Chemicals, Incorporated, Tokyo, Japan
No Drawing. Filed Nov. 16, 1971, Ser. No. 199,380
Claims priority, application Japan, Nov. 17, 1970, 45/100,674
Int. Cl. C08f 1/16, 3/42; C09d 11/00
U.S. Cl. 260—89.1                                        9 Claims

ABSTRACT OF THE DISCLOSURE

A radiation-curable printing ink which is characterized in that the same comprises a photo-polymerizable unsaturated compound, which is cured by addition polymerization under irradiation of ultraviolet rays prepared, as the first step, by reacting an addition-polymerizable, unsaturated monoepoxy compound with higher fatty acid to form an addition-polymerizable, unsaturated ester compound, and then as the second step, reacting such ester compound with a polyisocyanate compound, as the essential vehicle component.

---

This invention relates to printing inks which can be hardened and dried within extremely short time under irradiation of ultraviolet rays. More particularly, the invention relates to a printing ink which is prepared by adding a suitable photo-initiator to an ink vehicle comprising, as the essential component, specific photo-polymerizable unsaturated compounds, which are cured by addition polymerization under irradiation of ultraviolet rays and are compatible with fatty oils, and optionally various oils, resins, resinous varnishes, solvents, etc. conventionally used as printing ink materials, and further, if necessary, by milling with and dispersing pigments, extenders and/or auxiliary agents in the resulting components.

The printing ink of this invention is useful as a lithographic offset ink, relief printing ink, intaglio ink, and screen process ink, and which can be set or hardened and dried within extremely short time under irradiation of ultraviolet rays from a suitable apparatus.

Recent progress in printing techniques in various printing systems is indeed remarkable, but still the increase of the printing rate is a strong demand of the field. Particularly in the lithographic offset printing, relief printing, intaglio printing, and screen process printing using an oxidative polymerization type ink or quick set type oxidative polymerization ink, the printing rate depends on the drying speed of the printing ink. Conventionally employed inks have the common deficiency of low drying speed, and in order to supply the deficiency auxiliary means are practiced during the printing process such as frequent transfer of printed matters onto hardless, spraying corn starch or the like on the printed matters, etc., to prevent staining of the under surfaces of printed papers with the freshly printed ink leaving the printing machine, "blocking" etc., or the printed matters are exposed to wind before subjected to such post-procedures as cutting, bookbinding, etc. Particularly in the lithographic offset printing, relief printing, intaglio printing, or screen process printing in which the printed matters have non-absorbing surfaces such as of aluminum foil, plastic film, special processed paper, etc., the quick set mechanism, wherein the solvents or oils penetrate into the paper due to capillary phenomena occurring at the surfaces of printed matters to convert the printing ink from sol to gel, cannot take place. Therefore, in such cases drying of printing ink almost exclusively depends on the oxidative polymerization rate of the ink vehicle. Thus, drying of such printed matters requires several to ten and more hours, which seriously reduces the productivity of those printed matters. On the other hand, heat set type offset rotation printing and metallic plate printing are known as the printing systems utilizing external heat energy for improving the drying speed of the printing ink. However in both systems, enormous equipment cost is required for the drying oven, and furthermore, in the metallic plate drying dry-printing method for each color must be adopted for multi-color printing, which consumes excessive labor and time and requires high skill.

Accordingly, the object of this invention is to provide a printing ink which eliminates the extra labor, materials, and waiting time, etc.. required due to the slow drying speed of known printing inks in the lithographic offset printing, relief printing, intaglio printing, and screen process printing, and can remarkably accelerate the printing speed.

A further object of this invention is to provide an ultraviolet ray-hardenable, quick drying printing ink which enables the substitution of heat-drying ovens employed in the heat setting offset relation printing and metallic plate printing with an ultraviolet ray radiator and thereby, very substantial reduction in equipment cost for those printing systems and improvements in the printing efficiency and quality.

The concept of drying printing ink by ultraviolet ray irradiation is known, that is, Japanese patent publication No. 10606/57 discloses that the printing ink composed of a thermal reaction product of a glyceride of an unsaturated fatty acid containing two to four conjugated double bonds with maleic acid resin, a drier, and pigment, can be dried quickly by irradiation of ultraviolet rays.

Also U.S. Pat. No. 2,453,769 discloses that the composition prepared by adding methane bromide, methane iodide, and nitro derivatives of methane or halogenide such as hexachlorophenol, as photosetting promoter, to the ink vehicle containing at least 20% of eleostearate and ketoeleostearate, can be dried to the state that will not stain the adjacent under surface of the printing paper within a few seconds, when irradiated with the radiation energy within the ultraviolet rays wave band of 280 to 350 mm. only.

However, those known ultraviolet ray drying type printing inks are not more than the attempts to simply apply the polymerization-promoting effect of ultraviolet rays for tung oil, etc. to printint inks to increase the latter's drying speed, and their set-drying speeds are 15 seconds for the former and 11 seconds for the latter, under the ultraviolet ray irradiation conditions identical with those of the later given working examples of this invention. Thus they show no more than relatively slow setting property. Still in addition, the first-mentioned prior art ink is subject to such deficiencies as that, (1) due to the preparation of the vehicle through reaction of tung oil or the like with maleic acid resin, the ink contains a large quantity of maleic acid resin and consequently the ink cannot withstand the practical use in lithographic offset printing, because of its poor durability to water, (2) the preparation process of the vehicle is hardly practical and appropriate as that for making a stable quality vehicle varnish, because it requires reaction of tung oil or the like with maleic acid resin at temperatures causing gelation of tung oil or the like (approximately 230° C.), and (3) because the vehicle contains large quantities of fatty oil of which a chief component is an unsaturated fatty acid having conjugated double bonds, and maleic acid resin, the type of other vehicles concurrently usable with this vehicle is severely limited. On the other hand the latter ink is free from the above deficiencies due to the adoption of photosetting promoters but the selection of the photosetting promotors is limited. Therefore, in spite of the fact that the radiation energy of the ultraviolet ray wave band ranging approximately from 200 to 400 mm. is industrially easily available, the system requires such inefficient ultraviolet ray hardening method that the wave band of 245–260 mm. must be cut, and the radiation energy of specific wave band of 280–350 mm. alone is utilized. This signifies the increase in equipmental and running costs of the radiation apparatus and in the floor area required for the apparatus in the industrial scale working of the system, which obviously are economically very disadvantageous factors.

The printing ink of this invention is composed of the vehicle component which is the ultraviolet ray addition polymerizable, unsaturated compound formed by reaction of an addition polymerizable unsaturated ester compound with a polyisocyanate compound, and a suitable amount of ultraviolet ray polymerization initiator, the addition polymerizable, unsaturated ester compound being the reaction product of an addition polymerizable, unsaturated monoepoxy compound with higher fatty acid. The ink of this invention is suitably used as lithographic offset ink, relief printing ink, intaglio ink and screen process ink, and can be very quickly dried and hardened by the effective utilization of total radiation energy of the ultraviolet ray wave band of approximately 200 to 400 mm. which is usable with industrial convenience, as such is readily available from small size radiation apparatus.

Furthermore, the preparation of the present printing ink is subject to no critical limitation as to the starting materials and blending method, other than that the vehicle component must contain the above-specified ultraviolet ray addition polymerizable, unsaturated compound, and that a suitable ultraviolet ray polymerization initiator as later described must be added to the ink. That is, conventional vehicle materials employed in lithographic offset ink, relief printing ink, intaglio ink, and screen process ink, such as fatty oils, resins, resin varnishes, solvents, etc., can be freely incorporated at optional quantitative ratios, depending on the type of printing plate, printing system, or the intended utility, to impart to the product suitable printability and ink characteristics. According to the invention, therefore, the printing inks for the above plate types having sufficient printability and ink characteristics can be prepared by mixing the vehicle of this invention with optional pigments, dyestuffs and bodies or assistants by means of three rolls or a kneader, similarly to the conventional printing ink preparation, or a milling the vehicle with a flush base.

Many photo-sensitive compounds and photo-sensitive resins are already known. For example, photo-dimerizable polymers represented by polyvinyl cinnamate; photo-decomposition type polymers such as the series of diazo- and azide-compounds; photo-polymerizable polymers such as a polymer plus monomer system, etc. have been industrially utilized in the fields of plate making materials and paints. Particularly, most of the presently known photo-sensitive resin paints belong to the category of photo-polymerizable polymers, which generally are composed of polymer bases containing addition polymerizable unsaturated radicals in their molecules, such as unsaturated polyester type polymers and acrylic polymers, blended with vinyl monomers and photo-polymerization initiators. However, those polymer bases generally are insufficiently or hardly soluble in fatty oil, particularly vegetable drying oil such as linseed oil, tung oil, and the like, although they show sufficient solubility in the monomers used in combination therewith.

The ultraviolet ray addition polymerizable unsaturated compound which is the essential vehicle component of the subject printing ink is that produced by the reactions of the three types of compounds noted above as the indispensable reactants, and consequently shows satisfactory oil-solubility, particularly sufficient compatibility with vegetable drying oils such as linseed oil, tung oil, etc. as well as the ultraviolet ray addition polymerizable property. This is the unique feature of the compound, never expected of the known series of photo-polymerizable polymers as above-mentioned.

Printing inks must possess the satisfactory printability for intended utility, to meet the requirements which may slightly vary for each specific type of plate and printing system. Particularly the inks for lithographic and relief printing are subject to a number of limitations incurred by the printing machine. Normally the printability of an ink is determined mainly by its vehicle characteristics. For example, the vehicle component of a lithographic relief printing ink, particularly lithographic offset ink, must essentially possess; (1) suitable viscosity such as approximately 500–5,000 poises as well as suitable elasticity, plasticity, and length or thixotrapic property, (2) even and sufficient wettability and transferability to all the materials employed in the series of ink transfer procedures from the ink reservoir to the printed papers, via rollers, plate, and blanket; (3) adaptability to allow sufficient and stable dispersion of conventionally employed pigments, dyestuffs and bodies therein; and (4) suitable degree of durability against water. Among the industrially available materials satisfying all of the above conditions, a group of fatty oils represented by vegetable drying oil are the most preferred.

Furthermore, lithographic and relief printing inks need to migrate or be transferred over more than ten to twenty rollers which are the alternately disposed combinations of metallic rollers and rubber rollers, stably as thin ink film of approximately $10\mu$ in thickness, during the distribution procedure on the printing machine. For such stable transfer of printing ink in the distribution procedure, the vehicle of the ink should not contain more than ten and several percents by weight of low boiling point materials boiling at temperatures below 250° C., such as solvents. That is, such low boiling point materials in the ink vehicle evaporate during the distribution procedure on the printing machine to alter rheological characteristics of the ink, and thereby deteriorate the ink distribution property and transferability in the procedure, i.e., provide the cause of so-called "poor roller stability." Still in addition, the rubber rollers and blanket are occasionally made of synthetic rubber such as butadiene-nitrile rubber, and the image area of lithographic offset plate, of synthetic resin lacquer such as vinyl chloride-vinyl acetate copolymer. Both of those materials show considerable swellability or solubility to aromatic, ester type, and ketone type solvents. Therefore use of such solvents is again quantitatively severely limited.

Presently known photo-sensitive resin paints comprising a polymer base plus polymerizable monomer plus polymerization initiator at such quantitative ratios as will allow the hardening of the paint to coating of reticulated sructure within the shortest possible time under photo-irradiation as well as to enable the suitable adjustment of the paint's rheological characteristics. For this reason, low boiling point materials boiling at around 100–260° C., such as styrene, methyl methacrylate, butyl acrylate, ethylene glycol dimethacrylate, diethylaminoethyl methacrylate, 2-ethylhexyl methacrylate, etc., are normally used as the polymerizable monomers. (As is well known, use of higher boiling point substances as the polymerizable monomers appreciably slows down the hardening speed of such paint systems.) Those low boiling paint polymerizable monomers could impair the storage stability of the paints, and furthermore occasionally exhibit remarkable swellability and solubility to the afore-mentioned construction materials of the printing machine, such as the synthetic rubber and resin lacquer, etc. In short, utilization of such photo-sensitive resin paints using low boiling paint polymerizable monomers as the vehicle component of the printing ink is extremely unsatisfactory.

The photo-polymerizable unsaturated compound, which is cured by addition polymerization under irradiation of ultraviolet rays, employed as the essential vehicle component of the subject printing ink is prepared by, first reacting an addition polymerizable unsaturated monoepoxy compound (A) with a higher fatty acid (B), to form an unsaturated ester compound (C), and then by reacting the hydroxyl groups formed in the unsaturated ester compound (C) during the esterification reaction with a polyisocyanate Compound (D). Consequently, the ultraviolet ray addition polymerizable, unsaturated compound of the invention contains the addition polymerizable unsaturated linkage originating from the monoepoxy compound (A) employed as one of the reactants, as well as the urethane linkages formed by the reaction of hydroxyl groups of the unsaturated ester compound (C) with the polyisocyanate compound (D). Therefore, the compound can be rapidly dried and hardened by ultraviolet ray irradiation in the presence of oxygen or air, without the concurrent use of polymerizable monomers as above. Again the ultraviolet ray addition polymerizable unsaturated compound employed in the invention possesses the properties well resembling those of the fatty oils which are the ideal vehicle component of lithographic inks and relief printing ink, due to the fact that higher fatty acid is one of its starting materials. Consequently the compound not only exhibits suitable compatibility with fatty oils, but also, when it is used as the vehicle of printing inks, achieves the favorable results similar to those of using a fatty oil as the vehicle.

The ultraviolet ray addition polymerizable unsaturated compound of the invention can be prepared, for example, as follows: first an unsaturated monoepoxy compound (A) such as glycidyl acrylate, glycidyl methacrylate, allyl glycidyl ether, or the like, is reacted with a saturated or unsaturated higher fatty acid (B) such as the fatty acid of tung oil, dehydrated castor oil, whale oil, linseed oil, soybean oil, safflower oil, coconut oil, etc. to form an unsaturated ester compound (C); and then the hydroxyl groups in the unsaturated ester compound (C) are reacted with a polyisocyanate Compound D such as as 2,4-tolylenediisocyanate, 2,6-tolylenediisocyanate, 2,4-xylylenediisocyanate, lysinediisocyanate diphenylmethane - 4,4' - diisocyanate, naphthylene-1,6-diisocyanate, 3,3'-dimethyldiphenylmethane-4,4'-diisocyanate, diphenylether-4,4'-diisocyanate, triphenylmethane-4,4',4''-triisocyanate, diphenyl-2,4,4'-triisocyanate, 1,3,5-trimethylbenzene-2,4,6-triisocyanate, diphenylmethane-2,4,2',4'-tetraisocyanate, or a polyisocyanate compound containing at least two isocyanate radicals obtained by the reaction of such polyisocyanate compound as named above with a polyhydric alcohol such as trimethylolpropane, neopentylglycol, etc.

In the above procedure, it is also possible to substitute a part of the unsaturated ester compound (C) to be reacted with the polyisocyanate compound (D), with the below-described modifying agent (E), with the view to further improve the addition polymerizable property or oil-solubility of the ultraviolet ray addition polymerizable, unsaturated compound. As such modifying agent, for example, unsaturated hydroxy compounds such as 2-hydroxyethyl acrylate, 2-hydroxyethyl methacrylate, 2-hydroxypropyl acrylate, 2 - hydroxypropyl methacrylate, diglyceride of drying oil, oleyl alcohol, etc.; amino compound such as monoisobutylamine, diisobutylamine, mono-2-ethylhexylamine, monobenzylamine, 2-dibutylaminoethanol, etc.; and saturated monohydric alcohols of 8–18 carbon atoms such as tridecyl alcohol, n-octyl alcohol, 2-ethylhexyl alcohol, secondary octyl alcohol, 2,6-dimethyl-4-heptanol n-decanol, secondary undecyl alcohol, lauryl alcohol, secondary tetradecyl alcohol, secondary heptadecyl alcohol, stearyl alcohol, cetyl alcohol, benzyl alcohol, and tetrahydrofuryl alcohol, etc.; may be used.

Suitable quantitative ratios of the reactants are as follows: to 1.0 gram equivalent of the unsaturated monoepoxy compound (A), 0.8–1.2 gram equivalents of higher fatty acid (B), and to 1.0 gram equivalent of the unsaturated ester compound (C) formed by the reaction of the compounds (A) and (B), 1.5–0.1 gram equivalent of the polyisocyanate compound (D). If a part of the unsaturated ester compound (C) is replaced by the modifier (E) as the occasion demands, the replaceable amount is up to approximately 0.7 gram equivalent.

Hereinafter the synthesis of ultraviolet ray addition polymerizable, unsaturated compound of the invention will be explained in fuller details, with reference to specific examples, with the understanding that the given examples are only for the purpose of illustration, and never to be construed to limit the scope of the ultraviolet ray addition polymerizable, unsaturated compound.

EXAMPLE OF SYNTHESIS 1

(Synthesis of ultraviolet ray addition polymerizable, unsaturated compound No. 1)

A four neck flask having a capacity of 1,000 ml. was provided with a 200° C. thermometer, glass agitation rod, nitrogen gas inlet tube and cooler, and into which 566 g. of fatty acid of tung oil, 284 g. of glycidyl methacrylate (containing 100 p.p.m. of hydroquinone monomethyl ether), 568 mg. of p-benzoquinone, and 850 mg. of 2-methylimidazole were charged. The system was heated to effect the temperature rise at a constant rate, and given the temperature of 110° C. after an hour, under continuous nitrogen gas supply into the flask. The system was further stirred for 4 hours at such temperature, and then again heated to 120° C., followed by additional 4 hours stirring. Thus a transparent unsaturate ester compound having an acid value of approximately 6, and a viscosity of H (measured by Gardner-Holdt bubble viscometer) was obtained.

To the unsaturated ester compound, 94 g. of tung oil were added as the solvent, and the system was cooled to 70° C. Into the system then 87 g. of tolylenediisocyanate (composed of 80% of 2,4-isomer and 20% of 2,6 isomer) were dropped, which required approximately 2 hours. After a subsequent hour stirring at such temperature, a transparent, ultraviolet ray addition polymerizable, unsaturated compound No. 1 having a free isocyanate radical content of 0.2 wt. percent and a viscosity of 25.9 poises (25° C.) was obtained.

EXAMPLE OF SYNTHESIS 2

(Synthesis of ultraviolet ray addition polymerizable, unsaturated compounds Nos. 2 through 5)

The practice of above Example 1 was repeated except that the quantities of tolylenediisocyanate and of tung oil as the solvent were varied as in Table 1 below. Thus transparent ultraviolet ray addition polymerizable, unsaturated compounds Nos. 2, 3, 4, and 5 were obtained.

TABLE 1

| Sample number | Starting materials (g.) | | | | Viscosity (poise, 25° C.) |
|---|---|---|---|---|---|
| | Fatty acid of tung oil | Glycidyl methacrylate | Tolylenediisocyanate | Tungoil (solvent) (g.) | |
| 2 | 566 | 284 | 131 | 147 | 98.5 |
| 3 | 566 | 284 | 174 | 205 | 515 |
| 4 | 566 | 284 | 218 | 375 | 1,120 |
| 5 | 566 | 284 | 261 | 556 | 495 |

EXAMPLE OF SYNTHESIS 3

(Synthesis of ultraviolet ray addition polymerizable, unsaturated compound No. 6)

A three neck flask having a capacity of 1,000 ml. was provided with a 100° C. thermometer, glass agitation rod and cooler with its tip sealed with silica gel, and charged with 174 g. of tolylenediisocyanate (composed of 80% of 2,4-isomer and 20% of 2,6-isomer) and 72 g. of ethyl acetate as the solvent. The temperature of the system was raised at a constant rate under heating and stirring, up to 70° C. At such temperature, 116 mg. of p-benzoquinone dissolved in 116 g. of 2-hydroxyethyl acrylate (containing 300 p.p.m. of hydroquinone monomethyl ether) were added to the system under stirring, consuming 2 hours. Over the subsequent 2 hours, further 425 g. of the unsaturated ester compound synthesized in Example of Synthesis 1 were added to the system under stirring, at the above temperature. After an additional hour stirring, the reaction product's free isocyanate radical content became 0.2 wt. percent, whereupon the reaction was terminated. Cooling the system, the ultraviolet ray addition polymerizable, unsaturated compound No. 6 was obtained.

The compound was transparent, showed a good compatibility with fatty oils, and had a viscosity of approximately 8.9 poises (25° C.) when made into a 50 wt. percent tung oil solution.

EXAMPLE OF SYNTHESIS 4

(Synthesis of ultraviolet ray addition polymerizable, unsaturated compound No. 7)

The same apparatus as employed in the above example of Synthesis 3 was charged with 438 g. of Burnok D-750 (product of Dainippon Ink & Chemicals, Inc., the addition compound of 3 mols of tolylenediisocyanate per mol. of trimethylolpropane, which contains 25 wt. percent of ethyl acetate). The content was heated at a constant rate under stirring, and reached 70° C. within an hour. At such temperature 200 g. of tridecyl alcohol were added to the system consuming an hour, and 218 g. of the unsaturated ester compound obtained in Example of Synthesis 1 were added consuming another hour, followed by an additional hour stirring at the same temperature. The reaction was terminated when the free isocyanate radical content of the product became 0.3 wt. percent, and the system was cooled to allow the recovery of ultraviolet ray addition polymerizable, unsaturated compound No. 7.

The compound was transparent, and showed good compatibility with fatty oils. The 70 wt. percent tung oil solution had a viscosity of approximately 277 poises (25° C.).

EXAMPLE OF SYNTHESIS 5

(Synthesis of ultraviolet ray addition polymerizable, unsaturated compound No. 8)

The identical apparatus with that employed in Example of Synthesis 3 was charged with 174 g. of tolylene-diisocyanate and 57.5 g. of ethyl acetate as the solvent, and the temperature of the system was raised by heating at a constant rate, up to 70° C. after an hour. Maintaining such temperature, 52 g. of flaky neopentyl glycol were added to the system under stirring, consuming 2 hours. Still at the same temperature, immediately 137.5 g. of oleyl alcohol and 212.5 g. of the unsaturated ester compound synthesized in Example of Synthesis 1 were added to the system, which required 2 hours. The stirring was continued for the subsequent 2 hours at the same temperature. Then the reaction was terminated when the free isocyanate radical content of the product became 0.5 wt. percent. Cooling the system to room temperature, ultraviolet ray addition polymerizable, unsaturated compound No. 8 was obtained.

This compound was transparent and showed good solubility in oil. Its viscosity at 25° C. was approximately 2,600 poises.

EXAMPLE OF SYNTHESIS 6

(Synthesis of ultraviolet ray addition polymerizable, unsaturated compound No. 9)

The same apparatus as employed in Example of Synthesis 3 was charged with 174 g. of tolylenediisocyanate and 73 g. of ethyl acetate as the solvent, and the system was heated to 70° C. under stirring, as its temperature was raised at a constant rate. At such temperature, 130 g. of 2-hydroxypropyl acrylate (containing 300 p.p.m. of hydroquinone monomethyl ether) were added to the system consuming an hour, and subsequently 425 g. of the unsaturated ester compound synthesized in Example of Synthesis 1 were added, consuming further 2 hours. The stirring was continued for additional 3 hours at the same temperature, and the reaction was terminated as the free isocyanate radical content of the system became 0.5 wt. percent. Cooling the system off, the ultraviolet ray addition polymeriazle, unsaturated compound No. 9 was obtained.

The compound was transparent and had a good oil-solubility. Its viscosity at 25° C. was approximately 634 poises.

EXAMPLE OF SYNTHESIS 7

(Synthesis of ultraviolet ray addition polymerizable, unsaturated compound No. 10)

The same apparatus as employed in Example of Synthesis 3 was charged with 174 g. of tolylenediisocyanate and 87.4 g. of ethyl acetate as the solvent, and the system was heated to 70° C. Whereupon 275 g. of oleyl alcohol were dropped into the system, consuming approximately 1.5 hours. Still under same temperature, 425 g. of the unsaturated ester compound synthesized in Example of Synthesis 1 were added, consuming approximately 1.5 hours. The stirring was continued for additional 3 hours at the same temperature, and the reaction was terminated when the free isocyanate radical content of the system became 0.5 wt. percent. Cooling the system off to room temperature, the ultraviolet ray addition polymerizable, unsaturated compound No. 10 was obtained.

This compound was transparent and had a good oil-solubility. Its viscosity at 25° C. was approximately 107 poises.

EXAMPLE OF SYNTHESIS 8

(Synthesis of ultraviolet ray addition polymerizable, unsaturated compound No. 11)

The same apparatus as employed in Example of Synthesis 3 was charged with 425 g. of the unsaturated ester compound synthesized in Example of Synthesis 1 and 208 g. of tung oil as the solvent, and the system was heated to 70° C. under stirring, as its temperature was raised at a constant rate. At such themperature, 94 g. of xylylenediisocyanate were added to the system, consuming approximately an hour, followed by another hour stirring. Whereupon the free isocyanate radical content of the system was reduced to no more than 0.1 wt. percent, and so the reaction was terminated. Cooling the system off, ultraviolet ray addition polymerizable, unsaturated compound No. 11 was obtained.

The compound was transparent and showed good solubility in oil. Its viscosity at 25° C. was approximately 123 poises.

EXAMPLE OF SYNTHESIS 9

(Synthesis of ultraviolet ray addition polymerizable, unsaturated compound No. 12)

A four neck flask having a capacity of 1,000 ml. was equipped with a 200° C. thermometer, a glass agitation rod, nitrogen gas inlet tube, and a cooler and charged with 280 g. of fatty acid of dehydrated castor oil, 142 g. of glycidyl methacrylate (containing 100 p.p.m. of hydroquinone monomethyl ether), 844 mg. of p-benzoquinone, and 422 g. of 2-methylimidazole. While nitrogen gas was blown into, the system temperature was raised at a constant rate under stirring, until it reached 100° C. The system was stirred at such temperature for 7 hours, and then heated to 110° C., followed by additional 2 hours stirring. A transparent, unsaturated ester compound having an acid value of 100, and a viscosity of H (Gardner-Holdt system, 2.00 poises) was obtained.

The unsaturated ester compound was cooled to 70° C., and 87 g. of tolylenediisocyanate were added, consuming an hour. The system was maintained at such temperature for another hour, at the end of which the free isocyanate radical content was reduced to 0.5 wt. percent. The reaction was terminated, and the system was cooled to room temperature. Thus the ultraviolet ray addition polymerizable, unsaturated compound No. 12 was obtained.

The compound was transparent and showed a good solubility in oil. Its viscosity at 25° C. was approximately 3,000 poises.

The ultraviolet ray addition polymerizable, unsaturated compound employed as the essential component of the vehicle of subject printing ink exhibits the properties well resembling those of fatty oil, and its viscosity is variable over a wide range by controlling the amount of polyisocyanate compound (D). Therefore even when used alone, the compound can provide a quite satisfactory vehicle of printing inks suited to various plate types or printing systems. It is also permissible to use such other ink vehicle materials conventionally employed for lithographic offset ink, relief printing ink, intaglio ink and screen process ink, as fatty oils, e.g., refined linseed oil, various boiled oils, tung oil, dehydrated castor oil, oiticica oil, soybean oil, cuttlefish oil, cod oil, shark oil, whale oil, synthetic drying oils, lard, lanolin, etc.; resins such as oil modified alkyd resins, rosin maleic acid resin, rosin modified pentaerythritol ester resin, petroleum resin, xylene resin, urethanized or styrenated alkyd resin, cyclized rubber, chlorinated rubber, gilsonite, etc.; solvents such as light oil, spindle oil, spray kerosene, D-machine oil, ink oil, motor oil, Solvesso, ethyl Cellosolve, etc.; and vehicle assistants such as metallic soap or chelate of aluminum, versicol, chalcol, varnish etc., concurrently with the unsaturated compound, as the oscasion demands. The ultraviolet ray addition polymerizable, unsaturated compound and the optionally employed known fatty oils, resins, solvents and vehicle assistants can be simply mixed to provide satisfactory vehicle component of printing ink. Alternatively, all or a part of the vehicle component may be heated at a suitable temperature within cooking temperature range of 100–300° C., to be converted to polymerized or resin varnish before the use.

As the ultraviolet ray polymerization initiator useful for the invention, benzoin type polymerization initiators such as benzoin, benzoin methyl ether, benzoin ethyl ether, benzoin isopropyl ether, etc.; anthraquinone type polymerization initiators such as 1-chloroanthraquinone, 2-methylanthraquinone, etc.; halogenated sulfonyl type polymerization initiators such as naphthalenesulfonyl chloride, naphthalenedisulfonyl chloride, o-toluene sulfonechloride, etc.; and acetonitrile type polymerization initiators such as 1-bromo (p-nitrophenyl)acetonitrile, may be named. Among the above-mentioned, benzoin methyl ether and naphthalenesulfonyl chloride show particularly excellent effect for the printing ink of this invention.

Also the coloring matters usable in the printing ink of this invention include, for example, inorganic pigments such as carbon black, chrome yellow, titanium white, miroli blue, chrome Vermilion, etc.; organic pigments such as Hansa Yellow, Benzidine Yellow, Vulcan Orange, Permanent Orange, Lake Red C, Brilliant Carmine 6B, Rhodamine Lake, Eosine, Phloxine, Victoria Blue Lake, Phthalocyanine Green, Phthalocyanine Blue, Quinacridone Red, Dioxazine Violet, etc.; and dyestuffs such as Alkali Blue Toner, Methyl Violet, etc. If necessary, body pigments such as calcium carbonate precipitated barium sulfate, alumina white, etc., may be concurrently used.

Furthermore, the printing ink of this invention may contain, concurrently with the vehicle, polymerization initiator and coloring agent, driers composed of metallic soap of lead, manganese, cobalt, nickel, rare earth element, etc.; drying inhibitors such as bentonite, Orben, polyethylene, varnishes, greases, Vaseline, eugenol etc.; and ink assistants such as corn starch.

The preparation of printing ink of this invention using the foregoing starting materials can be performed similarly to the conventional practice of making known lithographic ink, relief printing ink, intaglio ink or screen process ink. That is an appropriate pigment or dyestuff is selected according to the intended characteristics such as color, color strength, light resistance and solvent resistance, and which may be mixed with the vehicle, polymerization initiator, and ink assistants, as dry pigment. Or, the coloring agent may be used in the form of flushed pigment formed by flushing with a part of the vehicle at the weight ratio of, as pigment to vehicle, 15:85–35:65, to be mixed with the rest of ink components. The pigment and/or dyestuff may be added in the amount of 0–70 wt. percent based on the weight of the vehicle and ink assistants. Further body of 0–40 wt. percent may be added, and if necessary, the system is thoroughly mixed and dispersed by means of a pre-mixer, and thereafter milled in a three-roll mill or a kneader until sufficient degree of milling is obtained. The milling temperature is preferably not higher than 60° C.

It is recommended that the printing ink of this invention should contain at least 10 wt. percent of the oil-soluble and addition polymerizable ultraviolet ray addition polymerization, unsaturated compound in the vehicle. If based on the total weight of the ink, the preferred content of the ultraviolet ray polymerization initiator is 1–10% by weight, particularly 2–8% by weight, and that of the ink assistants, from zero to approximately 10% by weight.

In order to explain the invention in fuller details, working examples are given below, in which parts are by weight. Those examples are strictly for illustrative purpose, and in no way limitative to the scope of this invention.

EXAMPLE 1

Synthetic resin varnishes A and B were prepared according to the following blending recipe.

Synthetic resin varnish A:

|  | Parts |
| --- | --- |
| (a) Polymerized linseed oil | 26 |
| (b) Rosin modified phenol resin (Beckacite 1126, product of Dainippon Ink & Chemicals, Inc.) | 20 |
| (c) Petroleum resin | 14 |
| (d) Light oil | 30 |
| (e) Aluminum octate solution | 10 |
| Total | 100 |

The above (a), (b), and (c) were together thermally dissolved at the cooking temperature of 260±5° C., for an hour in the absence of air, and cooled. To the system then (d) was added to adjust the viscosity to 80±5 poises, and then (e) was added, followed by 30 minute heating at 150±5° C. As a result the composition was gelated.

Synthetic resin varnish B:

|  | Parts |
| --- | --- |
| (a) Rosin modified phenol resin | 38 |
| (b) Refined linseed oil | 35 |
| (c) Tung oil | 18 |
| (d) Light oil | 8 |
| (e) Aluminum chelate | 1 |
| Total | 100 |

The above components (a), (b), and (c) were together thermally dissolved at the cooking temperature of 200±5° C. for an hour, in the absence of air, and cooled. To the system (d) was added to adjust the viscosity to 1,200±100 poises, and then further (e) was added. The system was gelated by the subsequent 30 minute heating at 85±5° C.

The prepared synthetic resin varnishes A and B, and the ultraviolet ray addition polymerizable, unsaturated compound No. 8 were blended at the following ratios and milled in a three-roll mill to form a sheet-lithographic offset ink I:

Sheet-lithographic offset ink I: | Parts
--- | ---
Brilliant Carmine 6 B | 20
Ultraviolet ray addition polymerizable, unsaturated compound No. 5 | 50
Synthetic resin varnish A | 20
Synthetic resin varnish B | 10
Light oil | 4
Benzoin methyl ether | 5
Total | 109

This printing ink had the flow-characteristics suitable for offset ink, as demonstrated by the tack value (TV) of 10±1 as measured by an Inkometer, diameter (DM) of 33±1 (mm.) as measured by Spreadometer (American Ink Maker, 28 (9) (1950)), and a slope (S) of at least 5. After drying and hardening, the ink film showed excellent luster.

This printing ink was draw-down of color on art coated paper at a quantity of charged ink of 0.15 cc. (The link film thickness was approximately 3μ, which corresponds to that on ordinary printed matters), using RI tester model II, and immediately irradiated with an ultraviolet ray irradiator equipped with a reflective cover which accommodated an ozoneless high pressure mercury lamp (output: 2 kw., output density: 28 w./cm., product of Phillips Co., Model HTQ-7), at a distance of 15 cm. Thus the time required for setting and drying of the printing ink film was measured. The set-drying time of this printing ink I was approximately 2 seconds.

EXAMPLE 2

The ultraviolet ray addition polymerizable, unsaturated compound No. 3 was used as the chief vehicle component, which was blended with four typical pigments each according to the recipes given in Table 2 below. Thus, through the procedures similar to those of Example 1, sheet-lithographic offset ink II–1, II–2, II–3, and II–4 were prepared.

TABLE 2

| Starting materials | Ink number (parts) | | | |
| --- | --- | --- | --- | --- |
|  | II-1 | II-2 | II-3 | II-4 |
| Benzidine yellow | 20 | | | |
| Brilliant carmine 6B | | 20 | | |
| Phthalocyanine blue | | | 20 | |
| Carbon black | | | | 20 |
| Alkali blue toner | | | | 8 |
| Ultraviolet ray addition polymerizable, unsaturated compound No. 3 | 61 | 60 | 57 | 54 |
| Tung oil | 14 | 15 | 18 | 13 |
| Benzoin methyl ether | 5 | 5 | 5 | 5 |
| Total | 100 | 100 | 100 | 100 |

The flow characteristics of those printing inks were as given in Table 3 below. The set-drying times of those inks were measured under the identical draw-down of color conditions and ultraviolet ray irradiation conditions as specified in Example 1. The results were as given also in Table 3 below.

TABLE 3

| Properties | Ink number | | | |
| --- | --- | --- | --- | --- |
|  | II-1 | II-2 | II-3 | II-4 |
| Ink flow characteristics: | | | | |
| TV | 13.5 | 12.0 | 12.5 | 13.0 |
| DM | 34.1 | 36.0 | 35.5 | 36.5 |
| S | 4.5 | 5.0 | 6.0 | 5.0 |
| Set-drying time (sec.) | 2.0 | 1.5 | 1.5 | 2.5 |

Those four printing inks were used to print each 5,000 sheets of coated paper with a sheet lithographic offset automatic two-color printing machine (Rolland Record, model RZKII) equipped with an irradiator. All the inks exhibited satisfactory printability on the printing machine and sufficiently set and dried at the practical printing rate.

EXAMPLE 3

Synthetic resin varnishes C and D were prepared according to the following recipes.

Synthetic resin varnish C: | Parts
--- | ---
(a) Light oil | 38
(b) Rosin modified phenol resin | 20
(c) Petroleum resin | 31
(d) Light oil | 10
(e) Aluminum octate | 1
Total | 100

The above (a), (b), and (c) were together heated and dissolved at 200±5° C. for an hour, in an air-intercepted atmosphere. Thereafter (d) and (e) were added to the solution at a temperature not higher than 60° C., and heated for approximately 30 minutes at 150±5° C. Thus the viscosity of the varnish was adjusted to be 300±50 poises.

Synthetic resin varnish D: | Parts
--- | ---
(a) Light oil | 47
(b) Rosin modified phenol resin | 40
(c) Light oil | 10
(d) Aluminum octate | 3
Total | 100

The above (a) and (b) were heated and dissolved at 200±5° C. for an hour in an air-intercepted atmosphere, cooled, and added with (c) and (d). Then the system was heated at 100° C. for approximately 30 minutes, to be gelated.

Through the procedures similar to those of Example 1, a lithographic offset rotation ink III was prepared from the ultraviolet ray addition polymerizable unsaturated compound No. 3 and above synthetic resin varnishes C and D, according to the recipe below:

Lithographic offset rotation ink III: | Parts
--- | ---
Brilliant Carmine 6B | 20
Ultraviolet ray addition polymerizable, unsaturated compound No. 3 | 45
Synthetic resin varnish C | 15
Synthetic resin varnish D | 10
Light oil | 8
Polyethylene compound | 5
Wax | 1
Naphthalenesulfonyl chloride | 5
Total | 109

This printing ink exhibited flow characteristics suited for lithographic offset rotation ink (TV=7±1, DM=38±1), and excellent luster when dry. The set-drying time of the ink under the identical draw-down of color and irradiation conditions with those specified in Example 1 was approximately 1 second.

EXAMPLE 4

A synthetic resin varnish E was prepared according to the recipe below:

Synthetic resin varnish E: | Parts
--- | ---
(a) Refined linseed oil | 17
(b) Petroleum resin | 42
(c) Spindle oil | 24
(d) Spindle oil | 17
Total | 100

The above (a), (b), and (c) were heated and dissolved at 150±5° C. for an hour, in an air-intercepted atmosphere, and cooled. At a temperature not higher than 100° C., (d) was added to the system to adjust the viscosity to 20±2 poises. A type printing ink IV was prepared through the procedures similar to those of Example 1, from the ultraviolet ray addition polymerizable, unsaturated compound No. 9 and synthetic resin varnish E, according to the recipe below.

Type printing ink IV:                                    Parts
    Miroli blue _____  30
    Calcium carbonate _____   5
    Precipitated barium sulfate _____   5
    Ultraviolet ray addition polymerizable, unsaturated compound No. 9 _____  40
    Synthetic resin varnish E _____  10
    Tung oil _____  10
    Benzoin methyl ether _____   5
                                                        ———
        Total _____ 105

This printing ink had the flow characteristics suited for type printing ink (TV=8±1, DM=34±2), and its set-drying time under the identical draw-down of color and irradiation conditions with those employed in Example 1 was approximately 1 second.

EXAMPLE 5

Through the procedures similar to those of Example 1, metallic plate ink V was prepared according to the recipe below, using the ultraviolet ray addition polymerizable, unsaturated compound No. 8.

Metallic plate ink V:                                   Parts
    Watchung Red _____  25
    Bentonite _____   2
    Ultraviolet ray addition polymerizable, unsaturated compound No. 8 _____  50
    Linseed oil modified alkyl resin _____  20
    Polymerized tung oil _____  10
    Light oil _____   5
    Naphthalenesulfonyl chloride _____   5
                                                        ———
        Total _____ 117

This printing ink exhibited flow characteristics suited for metallic plate ink (TV=18±2, DM=28±2). The ink was draw-down of color on a tin plate at an ink film thickness of approximately 6μ, and set and dried under the identical irradiation conditions with those specified in Example 1. The set-drying time thus measured was 1.5 seconds, and the time required for the complete hardening of the film was 20 seconds.

EXAMPLE 6

Through the procedures similar to Example 1, an intaglio ink VI was prepared according to the recipe below, using the ultraviolet ray addition polymerizable, unsaturated compound No. 7 as the vehicle component.

Intaglio ink VI:                                        Parts
    Miroli blue _____  15
    Calcium carbonate _____  40
    Bentonite _____   2
    Ultraviolet ray addition polymerizable, unsaturated compound No. 7 _____  28
    Tung oil _____  17
    Light oil _____  10
    Benzoin methyl ether _____   5
                                                        ———
        Total _____ 117

This printing ink exhibited the flow characteristics suited for intaglio ink (TV=13±1, DM=32±2). The ink was drawn-down of color to an ink film thickness of approximately 8μ under the identical conditions with those of Example 1, and irradiated again in the identical manner to Example 1. Thus measured set-drying time of the ink was 4 seconds.

EXAMPLE 7

Through the procedures similar to those of Example 1, screen process ink VII was prepared according to the recipe below, using the ultravoilet ray addition polymerizable, unsaturated compound No. 11.

Screen process ink VII:                                 Parts
    Brilliant Carmine 6B _____  15
    Titanium white _____  10
    Ultraviolet ray addition polymerizable, unsaturated compound No. 11 _____  45
    Tung oil _____  15
    Light oil _____   3
    Paraffin wax _____   3
    Aerosol 1B (an anion activator manufactured by American Cyanamide Co.) _____   1
    Benzoin methyl ether _____   5
                                                        ———
        Total _____ 109

This printing ink exhibited satisfactory printability required for screen process ink, having a DM of 32±2. The ink was draw-down of color to an ink film thickness of 10μ under the identical draw-down of color conditions as of Example 1, and irradiated again in identical manner as in Example 1. Thus measured set-drying time was approximately 5 seconds.

EXAMPLE 8

Through the procedures similar to those of Example 1, sheet-lithographic offset ink VIII was prepared according to the recipe below, using the ultraviolet ray addition polymerizable, unsaturated Compound No. 2 as the chief vehicle component.

Sheet-lithographic offset ink VIIII:                    Parts
    Brilliant Carmine 6B _____  20
    Ultraviolet ray addition polymerizable, unsaturated Compound No. 2 _____  55
    Tung oil _____  20
    Benzoin methyl ether _____   5
                                                        ———
        Total _____ 100

This printing ink exhibited printability satisfactory for sheet-lithographic offset ink, having the flow characteristics as follows: $TV=12±1$, $DM=32±2$, and $S>5$. The set-drying time of the ink measured under the identical draw-down of color and irradiation conditions with those employed in Example 1 was 3 seconds.

EXAMPLE 9

A synthetic resin varnish F was prepared according to the recipe below:

Synthetic resin varnish F:                              Parts
    (a) Rosin modified phenol resin _____  10
    (b) Tung oil _____  40
    (c) Ultraviolet ray addition polymerizable, unsaturated Compound No. 7 _____  50
                                                        ———
        Total _____ 100

The above (a) and (b) were heated and dissolved at 200±5° C. for an hour, in an air-intercepted atmosphere, and then cooled to 150° C. Then (c) was added and dissolved into the system in approximately 30 minutes, heating at such temperature, to adjust the viscosity of the varnish to 3000±5 poises (25° C.).

Through the procedures similar to those of Example 1, sheet-lithographic offset ink IX was prepared according to the recipe below, using the above synthetic resin varnish F.

Sheet-lithographic offset ink IX:                       Parts
    Brilliant Carmine 6B _____  20
    Synthetic resin varnish F _____  70
    Tung oil _____   5
    Naphthalenesulfonyl chloride _____   5
                                                        ———
        Total _____ 100

This printing ink exhibited the printability satisfactory for sheet-lithographic offset ink, having the flow characteristics as follows: $TV=12±1$, $DM=34±2$, and $S>5$.

The set-drying time of the ink measured under the identical draw-down of color and irradiation conditions with those of Example 1 was 0.8 second.

EXAMPLE 10

Through the procedures similar to those of Example 1, metallic plate ink X was prepared according to the recipe below, using the ultraviolet ray addition polymerizable, unsaturated Compound No. 3.

| Metallic plate ink X: | Parts |
|---|---|
| Phthalocyanine Blue | 20 |
| Ultraviolet ray addition polymerizable, unsaturated Compound No. 3 | 80 |
| Benzoin methyl ether | 5 |
| Total | 105 |

This printing ink exhibited the printability satisfactory for metallic plate ink, having the flow characteirstics as follows: $TV=22\pm1$, $DM=28\pm2$, and $S>5$. The ink was draw-down of color on a tin plate to an ink film thickness of approximately $6\mu$, and irradiated with ultraviolet rays under the identical conditions with those employed in Example 1. Thus measured set-drying time of the ink was 3 seconds, and the time required for complete hardening of the ink film was 15 seconds.

What we claim is:

1. A vehicle component for a radiation-curable printing ink comprising a photo-polymerizable unsaturated compound curables by addition polymerization under irradiation of ultraviolet rays, said photo-polymerizable unsaturated compound being prepared by reacting per 1.0 gram equivalent of an addition-polymerizable, unsaturated monoepoxy compound selected from glycidyl acrylate, glycidyl methacrylate and allyl glycidyl ether, 0.8–1.2 grams equivalent of a higher fatty acid component selected from the fatty acids of tung oil, the fatty acids of dehydrated castor oil, the fatty acids of whale oil, the fatty acids of linseed oil, the fatty acids of soybean oil, the fatty acids of safflower oil and the fatty acids of coconut oil to form an addition-polymerizable, unsaturated ester compound, and thereafter reacting per 1.0 gram equivalent of said ester compound with 0.1–1.5 grams equivalent of a polyisocyanate compound selected from 2,4-tolylenediisocyanate, 2,6-tolylenediisocyanate, 2,4-xylylenediisocyanate, lysinediisocyanate, diphenylmethane-4,4'-diisocyanate, naphthylene-1,6-diisocyanate, 3,3'-dimethyldiphenylmethane-4,4'-diisocyanate, diphenylether-4,4'-diisocyanate, triphenylmethane-4,4'-4'''-triisocyanate, diphenyl-2,4,4'-triisocyanate, 1,3,5-trimethylbenzene-2,4,6-triisocyanate and diphenylmethane-2,4,2',4'-tetraisocyanate.

2. A vehicle component for a radiation-curable printing ink comprising, as the essential vehicle component, a photo-polymerizable unsaturated compound, modified with a saturated monohydric alcohol of 8–18 carbon atoms and curable by addition polymerization under irradiation of ultraviolet rays, said modified photo-polymerizable unsaturated compound being prepared by reacting per 1.0 gram equivalent of an addition-polymerizable, unsaturated monoepoxy compound selected from glycidyl acrylate, glycidyl methacrylate and allyl glycidyl ether, 0.8–1.2 gram equivalent of a higher fatty acid component selected from the fatty acids of tung oil, the fatty acids of dehydrated castor oil, the fatty acids of whale oil, the fatty acids of linseed oil, the fatty acids of soybean oil, the fatty acids of safflower oil and the fatty acids of coconut oil to form an addition-polymerizable, unsaturated ester compound, and thereafter reacting per 1.0 gram equivalent of the mixture of said ester compound with said saturated monohydric alcohol, the content of the monohydric alcohol in the mixture being up to 0.7 gram equivalent and 0.1–1.5 gram equivalent of a polyisocyanate compound selected from 2,4-tolylenediisocyanate, 2,6-tolylenediisocyanate, 2,4-xylylenediisocyanate, lysinediisocyanate, diphenylmethane-4,4'-diisocyanate, naphthylene-1,6-diisocyanate, 3,3'-dimethyldiphenylmethane-4,4'-diisocyanate, diphenylether-4,4'-diisocyanate, triphenylmethane-4,4',4''-triisocyanate, diphenyl-2,3,3'-triisocyanate, 1,3,5-trimethylbenzene-2,4,6- and diphenylmethane-2,4,2',4'-tetraisocyanate.

3. A vehicle component for a radiation-curable printing ink comprising a photo-polymerizable unsaturated compound, modified with an unsaturated hydroxyl compound selected from 2-hydroxyalkyl acrylates, 2-hydroxyalkyl methacrylates and oleyl alcohol and curable by addition polymerization under irradiation of ultraviolet rays, said modified photo-polymerizable unsaturated compound being prepared by reacting per 1.0 gram equivalent of an addition-polymerizable, unsaturated monoepoxy compound selected from glycidyl methacrylate and allyl glycidyl ether, 0.8–1.2 gram equivalent of a higher fatty acid component selected from the fatty acids of tung oil, the fatty acids of dehydrated castor oil, the fatty acids of whale oil, the fatty acids of linseed oil, the fatty acids of soybean oil, the fatty acids of safflower oil and the fatty acids of coconut oil to form an addition-polymerizable, unsaturated ester compound, and thereafter reacting per 1.0 gram equivalent of the mixture of said ester compound with said unsaturated hydroxyl compound, the content of the unsaturated hydroxyl compound in the mixture being up to 0.7 gram equivalent and 0.1–1.5 gram equivalent of a polyisocyanate compound selected from 2,4-tolylenediisocyanate, 2,6-tolylenediisocyanate, 2,4-xylylenediisocyanate, lysinediisocyanate, diphenylmethane-4,4'-diisocyanate, naphthylene-1,6-diisocyanate, 3,3'-dimethyldiphenylmethane-4,4'-diisocyanate, diphenylether-4,4'-diisocyanate, triphenylmethane-4,4',4''-triisocyanate, diphenyl-2,4,4'-triisocyanate, 1,3,5-trimethylbenzene-2,4,6-triisocyanate, and diphenylmethane-2,4,2',4'-tetraisocyanate.

4. A composition for use in a radiation-curable printing ink comprising a photo-polymerizable unsaturated compound curable by addition polymerization under irradiation of ultraviolet rays, as the essential vehicle component, and an ultraviolet ray polymerization initiator, said photo-polymerizable unsaturated compound being prepared by reacting per 1.0 gram equivalent of an addition-polymerizable, unsaturated monoepoxy compound selected from glycidyl acrylate, glycidyl methacrylate and allyl glycidyl ether, 0.8–1.2 gram equivalent of a higher fatty acid component selected from the fatty acids of tung oil, the fatty acids of dehydrated castor oil, the fatty acids of whale oil, the fatty acids of linseed oil, the fatty acids of soybean oil, the fatty acids of safflower oil and the fatty acids of coconut oil, and thereafter reacting per 1.0 gram equivalent of the resulting addition-polymerizable, unsaturated ester compound with 0.1–1.5 gram equivalent of a polyisocyanate compound selected from 2,4-tolylenediisocyanate, 2,6-tolylenediisocyanate, 2,4-xylylenediisocyanate, lysinediisocyanate, diphenylmethane-4,4'-diisocyanate, naphthylene-1,6-diisocyanate, 3,3'-dimethyldiphenylmethane-4,4'-diisocyanate, diphenylether-4,4'-diisocyanate, triphenylmethane-4,4',4''-triisocyanate, diphenyl-2,4,4'-triisocyanate, 1,3,5-trimethylbenzene-2,4,6-triisocyanate, and diphenylmethane-2,4,2',4'-tetraisocyanate.

5. The composition of claim 4, wherein said ultraviolet ray polymerization initiator is benzoin methyl ether or naphthalenesulfonyl chloride.

6. A composition for use in a radiation-curable printing ink comprising a photo-polymerizable unsaturated compound modified with a saturated monohydric alcohol of 8–18 carbon atoms and curable by addition polymerization under irradiation of ultraviolet rays, as the essential vehicle component, and an ultraviolet ray polymerization initiator, said modified photo-polymerizable unsaturated compound being prepared by reacting per 1.0 gram equivalent of an addition-polymerizable, unsaturated monoepoxy compound selected from glycidyl acrylate, glycidyl methacrylate and allyl glycidyl ether, 0.8–1.2 gram equivalent of a higher fatty acid component selected from the fatty acids of tung oil, the fatty acids of dehydrated castor oil, the fatty acids of whale oil, the fatty acids of linseed oil, the fatty acids of soybean oil, the fatty acids of safflower oil and the fatty acids of coconut oil, and thereafter reacting per 1.0 gram equivalent of the mixture of the resulting addition-polymerizable unsaturated ester compound with said saturated monohydric alcohol, the content of the monohydric alcohol in the mixture being up to 0.7 gram equivalent and 0.1–1.5 gram equivalent of a polyisocyanate compound selected from 2,4-tolylenediisocyanate, 2,6 - tolylenediisocyanate, 2,4-xylylenediisocyanate, lysinediisocyanate, diphenylmethane-4,4'-diisocyanate, naphthylene - 1,6 - diisocyanate, 3,3'-dimethyldiphenylmethane - 4,4' - diisocyanate, diphenylether - 4,4' - diisocyanate, triphenylmethane-4,4',4''-triisocyanate and, diphenyl-2,4,4' - triisocyanate, 1,3,5-trimethylbenzene - 2,4,6 - triisocyanate, diphenylmethane-2,4,2',4'-tetraisocyanate.

7. The composition of claim 6, wherein said ultraviolet ray polymerization initiator is benzoin methyl ether or naphthalenesulfonyl chloride.

8. A composition for use in a radiation-curable printing ink comprising a photo-polymerizable unsaturated compound modified with an unsaturated hydroxyl compound selected from 2-hydroxyalkyl acrylate, 2-hydroxyalkyl methacrylate and oleyl alcohol and curable by addition polymerization under irradiation of ultraviolet ray, as the essential vehicle component, and an ultraviolet ray polymerization initiator, said photo-polymerizable unsaturated compound being prepared by reacting per 1.0 gram equivalent of an addition-polymerizable, unsaturated monoepoxy compound selected from glycidyl acrylate, glycidyl methacrylate and allyl glycidyl ether, 0.8–1.2 gram equivalent of a higher fatty acid component selected from the fatty acids of tung oil, the fatty acids of dehydrated castor oil, the fatty acids of whale oil, the fatty acids of linseed oil, the fatty acids of soybean oil, the fatty acids of safflower oil and the fatty acids of coconut oil, and thereafter reacting per 1.0 gram equivalent of the mixture of the resulting addition-polymerizable unsaturated ester compound with said unsaturated hydroxyl compound, the content of the unsaturated hydroxyl compound in the mixture being up to 0.7 gram equivalent and 0.1–1.5 gram equivalent of a polyisocyanate compound selected from 2,4-tolylenediisocyanate, 2,6-tolylenediisocyanate, 2,4-xylylenediisocyanate, lysinediisocyanate, diphenylmethane - 2,4' - diisocyanate, naphthylene - 1,6 - diisocyanate, 3,3'-dimethyldiphenylmethane-4,4' - diisocyanate, diphenylether - 4,4' - diisocyanate, triphenylmethane-4,4',4'' - triisocyanate, diphenyl-2,4,4'-triisocyanate, 1,3,5 - trimethylbenzene-2,4,6-triisocyanate, diphenylmethane and 2,4,2',4'-tetraisocyanate.

9. The composition of claim 8, wherein said ultraviolet ray polymerization initiator is benzoin methyl ether or naphthalenesulfonyl chloride.

References Cited
UNITED STATES PATENTS

| | | | |
|---|---|---|---|
| 2,948,611 | 8/1960 | Barney | 96—35.1 |
| 3,025,160 | 3/1962 | Bunge et al. | 260—18 TN |
| 3,226,227 | 12/1965 | Wolff | 96—33 XR |
| 3,424,766 | 1/1969 | Masters | 260—18 PT X |
| 3,616,364 | 10/1971 | D'Alelio | 204—159.23 X |
| 3,654,240 | 4/1972 | D'Alelio | 204—159.22 X |
| 3,654,106 | 4/1972 | Wagner et al. | 204—159.22 X |
| 2,718,516 | 9/1955 | Bortnick | 260—89.5 N |
| 3,673,140 | 6/1972 | Ackerman et al. | 204—159.19 |
| 3,712,871 | 1/1973 | Pasternack | 204—159.19 |

HARRY WONG, JR., Primary Examiner

U.S. Cl. X.R.

106—20, 27; 117—161; 204—159.22, 159,23, 159.24; 260—41 B, 41 C, 89.5 N

UNITED STATES PATENT OFFICE
CERTIFICATE OF CORRECTION

Patent No. 3,803,109      Dated April 9, 1974

Inventor(s) Yuhei NEMOTO ET AL

It is certified that error appears in the above-identified patent and that said Letters Patent are hereby corrected as shown below:

In Column 16, claim 3, line 10 thereof: after "from" insert -- glycidyl acrylate, --

Signed and sealed this 15th day of October 1974.

(SEAL)
Attest:

McCOY M. GIBSON JR.
Attesting Officer

C. MARSHALL DANN
Commissioner of Patents